April 14, 1953 — R. M. BARTH — 2,634,653
PICTURE PROJECTOR FOR FILM SLIDES
Filed June 19, 1951 — 2 SHEETS—SHEET 1
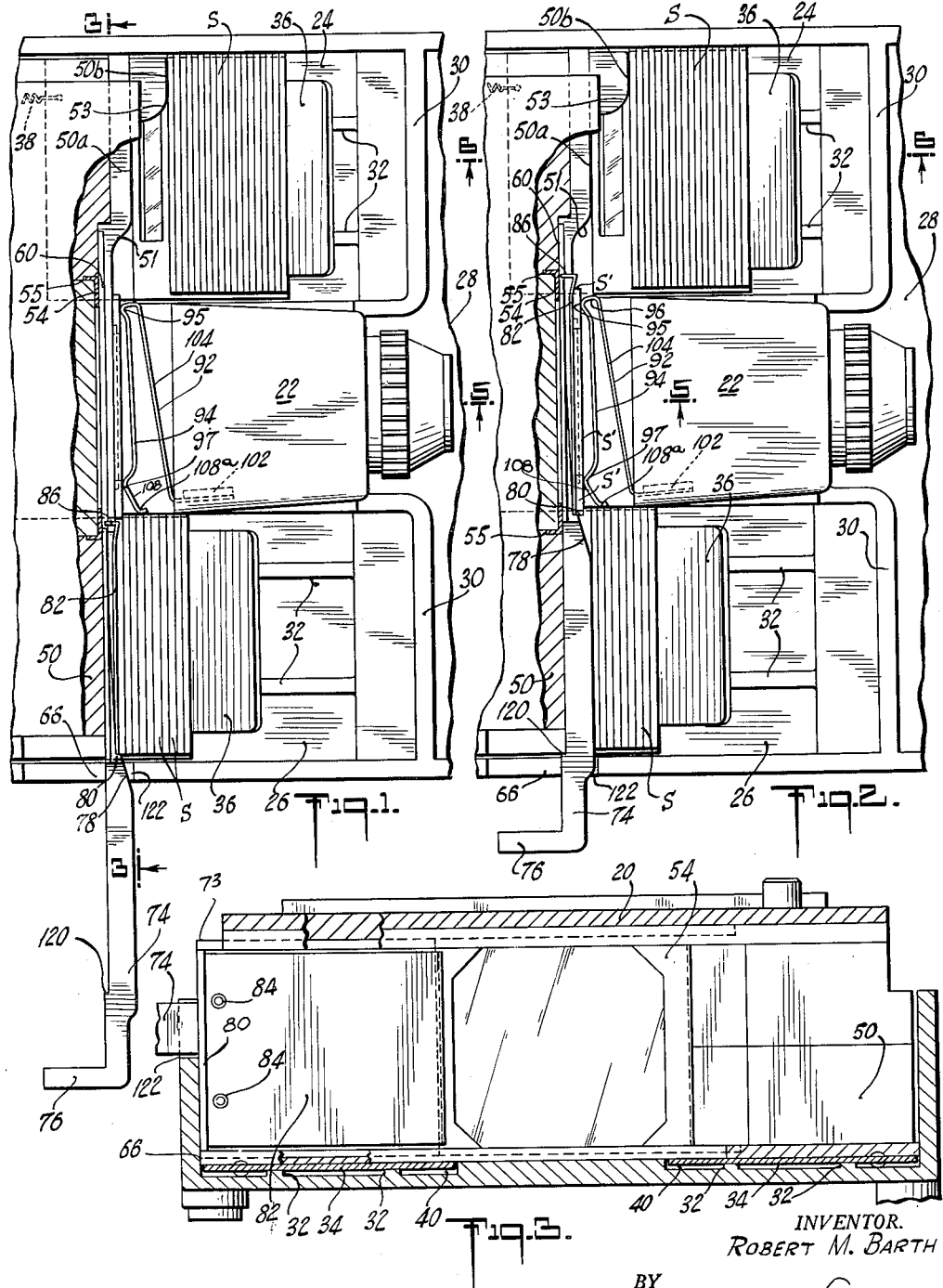
INVENTOR.
ROBERT M. BARTH
BY William R. Lieberman
ATTORNEY.

April 14, 1953     R. M. BARTH     2,634,653
PICTURE PROJECTOR FOR FILM SLIDES
Filed June 19, 1951     2 SHEETS—SHEET 2
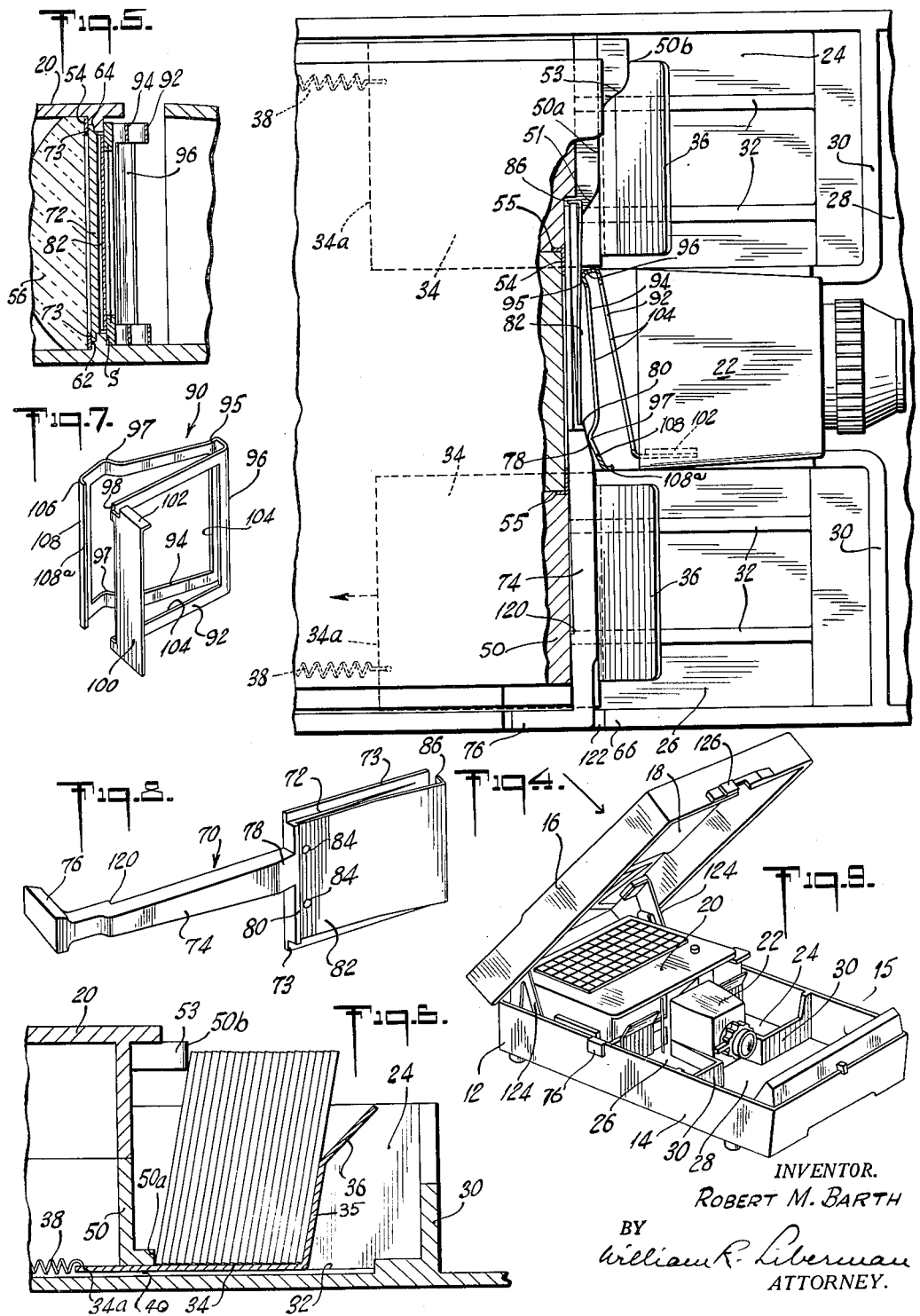

Patented Apr. 14, 1953

2,634,653

UNITED STATES PATENT OFFICE 2,634,653

PICTURE PROJECTOR FOR FILM SLIDES

Robert M. Barth, Pelham Manor, N. Y., assignor to The FR Corporation, New York, N. Y., a corporation of New York Application June 19, 1951, Serial No. 232,431

8 Claims. (Cl. 88—24)

The present invention relates generally to the art of photography, and in particular it relates to the field of projection. More particularly, the present invention relates to devices for projecting and viewing transparent, cut film material, both in color and in black and white, and especially films mounted in slide carriers, whether of paper, cardboard, metal, plastic or other materials, as distinguished from strip or roll film projection.

The art of film projection devices operating either directly onto an opaque screen for viewing from the projection side, or onto a translucent screen for viewing from the opposite side, has been well developed, as exemplified by the hundreds of devices of which records are available. However, in the handling of cut films mounted in individual carriers, many problems arise in connection with the proper positioning of the carrier with respect to the light source and lens. Many slide carriers, particularly those supplied by the processor, are made of thin paper or cardboard, and these tend to fray and wear after some use, not only at their marginal edges, but also about the film window margins. All too often, a frayed edge of a carrier will rub against and tear the window margin. Also, the frayed or torn window of one carrier will engage the window of an adjacent carrier. At least with paper or cardboard carriers, this slide hooking is a major cause of jamming in projectors. Carriers of plastic or metal material tend to bend or warp out of their original line, and the faults of all of these carriers are reflected in jamming thereof within the changer, or in their overlapping, with attendant difficulty in the operation of the machine and in the viewing thereof.

The main and associated objects of the present invention, therefore, are in the provision of a slide carrier changer mechanism wherein the likelihood or possibility of jamming and overlapping has been minimized; wherein the carrier engaged by the pusher for movement into projecting position is first advanced slightly laterally of the stack, and is then separated from the stack in the feed chamber by displacement of the latter, the engaged slide thereupon being further advanced; wherein the carrier is moved from projecting position into the storage chamber and automatically angled outwardly first at its lower edge and then, to a greater degree, at its upper end whereby to avoid engaging any portion of the last slide in the storage chamber; wherein the last viewed or projected slide carrier, when finally shifted clear of the projecting position, snaps flatly against the rear of the stack in the storage chamber; and wherein the slide carrier is flatly and resiliently maintained in the viewing position and resiliently held until completely discharged therefrom.

Other, further and more specific objects of the present invention will in part be obvious and in part apparent from the following description of an illustrative embodiment thereof.

In the drawing annexed hereto, forming a part hereof,

Figure 1 is a partial plan view of one form of device, partly broken away, constructed according to and embodying the present invention, with a slide carrier disposed in viewing position;

Figure 2 is a similar view showing the position of the slide pusher at the intermediate point in the change cycle;

Figure 3 is a section on the line 3—3 of Figure 1;

Figure 4 is a view similar to Figures 1 and 2, showing the position of the slide pusher in an inoperative position within the device prior to its arrangement for slide handling;

Figure 5 is a partial section on the line 5—5 of Figure 2;

Figure 6 is a section on the line 6—6 of Figure 2;

Figure 7 is a perspective view of the spring for locating and retaining the slide in viewing position;

Figure 8 is a perspective view of the pusher; and

Figure 9 is a perspective view of the portable slide projector-viewer of the present invention.

Referring to the drawings, and particularly to Figure 9 thereof, the device of the present invention comprises a carrying case 12 having a recessed body portion 14 wherein the projection lamp condenser assembly, lens system and slide changer mechanisms are disposed, and a cover 16 hingedly secured adjacent the rear of the body for positioning the cover at the correct viewing angle, it being noted that a translucent screen 18 is disposed in cover 16, whereby projected films can be viewed on screen 18, on looking in the direction of the arrow. Certain aspects of the carrying case are described and claimed in copending application Serial No. 199,249, filed December 5, 1950.

Both case body 14 and cover 16 are preferably formed of plastic material or the like, body 14 being shaped to receive and properly locate therewithin the lamp housing and condenser assembly beneath lid 20, with lens assembly 22 and the slide changer mechanism disposed forwardly thereof. The light source, the condenser system and the lens housing are in alignment to form an optical pathway, and the slide changer mechanism operates across and at right angles to said pathway. A pair of rectangularly shaped, open-topped compartments 24, 26 are provided one on each side of body 14 in communication with the changer track to receive the slide carriers prior to and after passage through the changer mechanism, and a transversely extending open-topped compartment 28 is provided at the front of the body 14 to receive the electric cord or for other storage purposes. The right angled walls 30 defining the compartments, 24, 26, 28 are formed as an integral part of body 14, with the side walls and floor of the body merging. Compartment 26 will be referred to hereinafter as the feed chamber and compartment 24 as the storage chamber.

On the floor of each of compartments 24, 26, there is provided a plurality of integral and laterally extending skid rails 32, 32 atop which are slidably disposed flat bottomed slide carrier supporting trays 34, 34, each tray having an upwardly extending and forwardly angled retainer wall 35, terminating in a more forwardly angled lip 36 at the front end thereof. A normally contracting coil spring 38 is fastened by an end thereof to the rear of each tray 34, the other end of the springs 38, 38 being anchored to projections or studs (not shown) at the rear of body 14 whereby trays 34, 34 are normally drawn under tension of springs 38 towards the rear of body 14 and against the changer mechanism in the positions shown in Figures 4 and 9. Thus, when a plurality of slide carriers are disposed in feed chamber 26, they will be yieldingly urged towards the changer mechanism, and as they are passed through the changer into storage chamber 24, and successively stacked against the tray wall 35 therein, said tray will be urged outwardly and towards the front of the chamber as the slides stack up therewithin, and the slides in both chambers 24, 26 will at all times be yieldingly held in upright, on-edge position, as shown in Figures 1, 2 and 6. As seen in Figure 3, trays 34, 34 are located to slide back and forth in channels 40, and the trays are of such length that the rearmost portion 34a thereof will be keyed beneath wall 50 even when the tray is extended to the forward limit of movement, to secure the trays within their respective chambers and prevent dislodgment therefrom.

Wall 50 is horizontally divided midway of its height. The lower portion is formed as an integral part of the body 14 while the upper portion is formed as an integral part of the cover 20 of the lamp housing and condenser assembly, extending downwardly therefrom. Wall 50 has a centrally located aperture in the line of the optical pathway in order to permit the light to pass therethrough from the light source, through the condenser assembly, the film under projection and the lens system. A centrally apertured frame member 54 is set into the front of wall 50 as at 55 about the aperture in wall 50, said frame 54 serving also to contain the condenser elements 56 within the recess capped by cover 20. Wall portions 50, 50 and frame 54 thus define the rear of the slideway 60, the floor of which is grooved or channelled as indicated at 62. The top of slideway 60 is similarly, but reversely grooved or channelled as at 64, channels 62, 64 extending across from the slide pusher operating side 66 to a point short of the opposite side, functioning to key the pusher 70 therewithin. While wall 50 opposite chamber 26 and the viewing position is perfectly straight, the lower edge of wall 50 opposite storage chamber 24 is shouldered forwardly towards the interior of chamber 24, along a cammed portion 51 merging into the extension 50a, from a point immediately past the viewing position. The upper edge of wall 50 opposite chamber 24 is also shouldered forwardly into chamber 24 beyond extension 50a, the upper extension 50b being shorter across the width of chamber 24 than the lower extension 50a, and camming as at 53 from wall 50 into said extension 50b.

Pusher 70 comprises a flat plate 72 of rectangular outline having a narrow control shaft 74 extending rearwardly therefrom, terminating in an angled finger piece 76 whereby the pusher may be manipulated. Adjacent plate 72, shaft 74 is provided with a forwardly extending cammed shoulder 78, the purpose and operation of which will be developed below.

The vertical edge of pusher plate 72 adjacent shaft 74 on its frontal aspect is provided with a forwardly projecting rib extending vertically of the plate, defining a right angled shoulder 80 whereby to engage the rear edges of the carriers to be threaded through the device. Within the shoulder defined by rib 80, there is disposed an end of a leaf spring 82 which is fixed to plate 72 by rivets 84, 84. The free end of spring 82 extends beyond the leading edge of plate 72 and is rearwardly bent as indicated at 86. The normal biasing of spring leaf 82 is such that the free end 86 flexes away from plate 72, see Figure 8. However, under the compression of springs 38, 38 acting on tray lips 36, 36 and the interposed carriers, leaf 82 will be urged towards flat lying relationship with plate 72, it being noted that leaf 82 and plate 72 are generally coextensive in area except that the upper and lower horizontal edges 73 of plate 72 extend above and below leaf 82 and except for the lateral extension of spring end 86 beyond the leading edge of plate 72. Said extended edges 73 are of reduced thickness so as to fit snugly within channels or grooves 62, 64.

A pressure plate 90 is provided and interposed in the optical pathway between the lens housing 22 and the connecting wall portion 50, whereby to provide and maintain uniform pressure on the slide carriers under view, and to maintain the carriers in proper position for optimum results between the light source through frame 54 and the lens assembly 22. Pressure plate 90 comprises a strip of spring material bent along a vertical line to provide a front wing 92 and a back wing 94. Wing 92, disposed towards the lens housing, is generally flat, while wing 94 disposed rearwardly of wing 92 is provided with a vertical crimping 95, at its connected end 96, and crimpings 97, 97 spaced slightly from its free end, for reasons to be developed below. The free end 98 of front wing 92 is provided with a forwardly angled arm 100, the upper end 102 of which is bent over so as to friction fit within lens housing 22, see Figures 1, 2 and 4. Both wings 92 and 94 of pressure plate 90 are similarly and rectangularly apertured as at 104, and said openings will be in registry when the two wings are urged towards each other. The free end 106 of rear wing 94 is angled towards the front wing, defining a cammed portion 108, terminating in a forwardly and inwardly directed lip 108a.

The operation of the device of the present invention is as follows: As illustrated in Figure 1, carrier pusher 70 is in retracted position, with handle 74 extended outwardly past side wall 66 and through a notch 122 in the upper edge thereof. A plurality of slide carriers S of conventional rectangular outline are disposed on edge within feed chamber 26 when tray lip 36 has been pulled away sufficiently from wall 50 on extension of spring 38. When lip 36 is released, the carriers S resting against tray wall 35 will be urged towards wall 50 by the normal contraction of spring 38. As control shaft 74 is pushed inwardly by manual pressure on finger piece 76, shoulder 80 on shaft 72 will engage the rear vertical edge of the most rearwardly positioned slide S', and said slide S' will be pushed along in advance of shoulder 80 until it (see Figure 2) is positioned between frame 54 and pressure plate 90. As shaft 74 moves into the device, shifting the engaged carrier laterally of the stack, the cammed shoulder 78 thereon will bear against the remaining carriers S, S in the stack atop tray 34 in the feed chamber 26, and shift them forwardly and free of the carrier S' previously engaged by plate shoulder 80, thus clearly spacing the engaged carrier from the remainder thereof in feed chamber 26. Shoulder rib 80 necessarily extends forward of plate 72 a distance sufficient to engage only one carrier at a time. This feature and the displacement of the stack by the cammed shoulder 78 thus eliminates any possibility of two or more carriers being borne along with pusher 72. As carrier S' enters the track between frame 54 and pressure plate 90, the leading vertical edge thereof will ride along the cammed portion 108 on wing 94 urging same against wing 92, the pressure member flexing at the bend line 96 and at points 98, 98 adjacent arm 100 fixed in lens housing 22. Crimpings 97, 97 will thus exert a constantly applied resilient pressure on the particular carrier S' as it moves into viewing position in the optical pathway. As the leading vertical edge of carrier S' reaches its ultimate position astride the optical pathway, it will have been moved past the second crimping 95 and the pressure of plate 90 will then be applied along both sides and at the top and bottom of the carrier to hold it flatly against spring leaf 82 which is then (as shown in Figure 2) pressed almost flatly against its plate support 72. A shoulder 120 on the rear aspect of handle 74 butting against the depending side wall of cover 20 serves to limit inward movement of pusher 70, shoulder 120 being so positioned that when in the position of Figure 2, plate 72 registers with the optical center of the light, condenser and lens system line. As handle 74, 76 and plate 72 are retracted, spring 90 will exert sufficient pressure on slide S' as to retain it in position between plate 90 and frame 54, and the light will, therefore, be permitted to pass through the film mounted in the carrier, through the lens in assembly 22 onto the angled mirror (not shown) on the front wall 15 of body 14 and reflected onto screen 18. As plate 72 and spring leaf 82 are retracted, the pressure of member 90 will press the carrier flatly against frame 54 and into parallelism therewith to insure proper optical alignment of the film in the carrier with the condenser and lens system.

As the handle is fully retracted until the rib-bearing edge thereof butts against the side wall of the body, the stack of carriers remaining in chamber 26 will be urged against spring leaf 82, pressing same against plate 72 and rearwardly of the carrier urged thereagainst. As finger piece 76 is manipulated to move plate 72 inwardly, the rearwardly bent portion 86 of spring leaf 82, in advance of the leading edge of plate 72 in the position of Figure 1, will butt against the rear vertical edge of carrier S' and push it along with its own movement towards storage chamber 26. As is the more usual condition, however, the relative dimensionings of the chambers, viewing position, width of carriers, etc., is such that the leading edge of the rearmost carrier in the stack will be butted against the slide in the viewing position. In the position of Figure 1, however, spring end 86 will initially engage and shift the carrier in the viewing position until its rear edge is free of the stack, whereupon the pressure of the stack against spring leaf 82 will urge same against plate 72, at which point the engaged carrier will continue to move the carrier in the viewing position into the storage chamber. Thus, as the pusher is advanced, the engaged carrier will advance before it the carrier previously disposed in the viewing position. The lower portion of the engaged carrier will first ride forwardly along curve 51 and thence shoulder 50a, angling the carrier forwardly along its lower portion, and as the leading vertical edge of the carrier S' reaches and rides outwardly on curve 53 along extended shoulder 50b, the upper portion of the carrier will be angled outwardly beyond the lower and will finally come to rest flatly against tray lip 36 (if it is the first carrier threaded through the apparatus) or against the stacked carriers already on the storage tray. With this angulation of the slide carrier as it is pushed into storage chamber 24 by leaf 82, the carriers are prevented from window hooking one another, and are thereby maintained out of such contact as might damage the carrier, it being understood that conventional carriers or slide binders are of paper, cardboard, tape or of like easily damageable material.

After the last slide carrier or binder is processed through the apparatus and disposed in storage chamber 24, and it is desired to store the apparatus, handle 74 is pushed inwardly until shoulder 120 butts against the depending side wall component of cover 20. Notch 122 in the side 66 of body 14 is of greater width than the thickness of handle 74, and if handle 74 is urged forwardly until shoulder 120 clears the side wall component of the cover, it may be pushed into the trackway until finger piece 76 is aligned with side wall 66 of body 14, see Figures 4 and 8. Cover hinges 124, 124 may then be actuated to permit cover 16 to drop onto body 14 and the cover may then be locked onto body 14 by means of catch 126.

It is to be understood that the width of chambers 24, 26 is determined by the size of the carriers S to be processed through the device. Preferably, the chambers should be only a little wider than the carriers in order that they may be introduced and removed easily, but without too much play from side to side. In Figures 1, 2 and 3 the carriers S, S are shown disposed against one side of the chambers. Actually, however, the carriers would locate themselves equidistantly between the sides of the chambers. Also, as illustrated in Figures 1 to 4, trays 34, 34 fit snugly in channels 40, 40 so as to maintain straight line movement back and forth therewithin. The term slide carrier as used in the appended claims refers to but is not limited to the conventional devices used for supporting the material being projected, whether of paper, cardboard, glass, metal or the like.

Having now described the invention, what I claim and desire to secure by Letters Patent is:

1. In an optical projection apparatus of the character described for projecting transparencies, a casing enclosed light source and a lens system aligned therewith and in spaced relation thereto forming an optical pathway, a slide carrier track between the light source and lens system extending across the pathway, a slide carrier pusher reciprocally shiftable back and forth within the track across the pathway, a feed chamber for a plurality of slide carriers and a storage chamber for said slide carriers on opposite sides of the pathway and in communication with the track, the pusher comprising a flat plate trapped in the track and having a shaft extended rearwardly and axially thereof whereby the plate can be moved back and forth within said track, resilient means in the feed chamber to urge the slide carrier therewithin towards the pusher and into alignment with the track, and means on the pusher to engage a single slide carrier for movement therewith and means associated with the pusher to displace from the said single slide carrier the remaining carriers in the feed chamber.

2. The projection apparatus of claim 1, wherein the slide carrier displacing means are on and a part of the rearwardly extended shaft.

3. The projection apparatus of claim 1, wherein the slide carrier displacing means comprise a forwardly cammed shoulder on the shaft immediately adjacent the slide carrier engaging means on the pusher plate.

4. In an optical projection apparatus of the character described for projecting transparencies, a casing enclosed light source and a lens system aligned therewith and in spaced relation thereto forming an optical pathway, a slide carrier track between the light source and lens system extending across the pathway, a slide carrier pusher reciprocally shiftable back and forth within the track across the pathway, a feed chamber for a plurality of slide carriers on one side of the pathway and a storage chamber for said slide carriers on the opposite side of the pathway, both chambers communicating with the track, the pusher comprising a flat plate trapped in the track and extending lengthwise thereof, said plate having a shaft extended rearwardly and axially thereof whereby the plate can be moved back and forth within said track, means in the feed chamber normally operative to urge a slide carrier therewithin towards the track, means on the pusher to engage the rearmost slide carrier for movement therewith and means on the shaft spaced rearwardly from the engaging means operative to displace any other slide carriers in the feed chamber immediately after engagement of the rearmost slide carrier and against the normal biasing of the slide carrier urging means.

5. In an optical projection apparatus of the character described for projecting transparencies, a casing enclosed light source and a lens system aligned therewith and in spaced relation thereto forming an optical pathway, a slide carrier track between the light source and lens system extending across the pathway, a slide carrier pusher reciprocally shiftable back and forth within the track across the pathway, a feed chamber and a storage chamber adapted to receive a plurality of slide carriers on opposite sides of the pathway in communication with the track, the pusher comprising a flat plate trapped in the track and extending lengthwise thereof having a shaft extended rearwardly and axially thereof whereby the plate can be moved back and forth within said track, means in the feed chamber normally operative to urge a slide carrier therewithin towards the track, means at the rear of the pusher plate to engage the rearmost slide carrier in the feed chamber for movement therewith into the optical pathway, means on the shaft adjacent the last mentioned engaging means and rearwardly thereof operative immediately after said engagement to displace the remaining slide carriers in the feed chamber, and means at the front of the pusher to displace any slide carriers in the optical pathway and push them forwardly and into the storage chamber.

6. In the projection apparatus of claim 5, wherein the last referred to means comprise a spring leaf substantially coextensive in area with the plate, one end of which leaf is fixed flatly to one side of the plate, and the other end of the leaf extends freely beyond the other side of the plate, is bent over at right angles towards said plate and is normally sprung away from the plate.

7. An optical projection apparatus of the character described for projecting slide transparencies, comprising an encased light source and a lens system aligned therewith and in spaced relation thereto forming an optical pathway, a slide carrier feed chamber on one side of the pathway and a slide carrier storage chamber on the opposite side of the pathway, a track having a rear wall and top and bottom walls extending through the feed chamber at the rear thereof across the optical pathway in the space between the light source and the lens system, a slide carrier pusher plate trapped in the track and extending lengthwise thereof, said plate being reciprocally shiftable between one position opposite the feed chamber and a second position in the optical pathway short of the storage chamber, the pusher plate having means at one end thereof to engage a slide carrier from the feed chamber when in the first position to shift it astride the optical pathway when in the second position, said pusher plate having means at the other end thereof when in the first position to engage a slide carrier in the optical pathway and to shift it into the storage chamber when in the second position, a resilient apertured pressure plate disposed in the optical pathway between the lens system and the light source normally biased to press against the rear wall of the track and an interpositioned slide carrier at a plurality of points spaced over the surface of the slide carrier to maintain uniform pressure on said slide carrier.

8. An optical projection apparatus as in claim 7, in which the pressure plate comprises a folded spring leaf, one wing of which is directed towards the lens system and the other wing is directed towards the rear wall of the track, and the fold line of said leaf is positioned on the storage chamber side.

ROBERT M. BARTH.

References Cited in the file of this patent

UNITED STATES PATENTS

| Number | Name | Date |
|---|---|---|
| 590,903 | Newman | Sept. 28, 1897 |
| 1,002,078 | Pooli | Aug. 29, 1911 |
| 2,213,779 | Young | Sept. 3, 1940 |
| 2,298,322 | Wengel | Oct. 13, 1942 |
| 2,525,564 | Simmons | Oct. 10, 1950 |
| 2,533,441 | Estes | Dec. 12, 1950 |